US011599910B2

(12) United States Patent
Stoyles

(10) Patent No.: US 11,599,910 B2
(45) Date of Patent: Mar. 7, 2023

(54) APPARATUS FOR PRINTING, DISPLAYING, AND MANAGING DOCUMENTS, DIGITAL CONTENT, ADVERTISING, SOCIAL MEDIA, MOBILE CATALOGUES AND THE LIKE FOR RETAIL PREMISES, AND SYSTEM THEREOF

(71) Applicant: SignIQ Pty Ltd, Perth (AU)

(72) Inventor: Christopher Geoffrey Stoyles, Canning Vale (AU)

(73) Assignee: Last Yard Pty Ltd, Perth (AU)

( * ) Notice: Subject to any disclaimer, the term of this patent is extended or adjusted under 35 U.S.C. 154(b) by 199 days.

(21) Appl. No.: 16/678,270

(22) Filed: Nov. 8, 2019

(65) Prior Publication Data

US 2020/0219136 A1 Jul. 9, 2020

(30) Foreign Application Priority Data

Jan. 8, 2019 (AU) .................................. 2019900049

(51) Int. Cl.
| | | |
|---|---|---|
| *G06Q 30/02* | (2012.01) | |
| *G06Q 30/0251* | (2023.01) | |
| *G06F 16/25* | (2019.01) | |
| *G06F 3/14* | (2006.01) | |
| *G06Q 20/20* | (2012.01) | |

(52) U.S. Cl.
CPC ....... *G06Q 30/0269* (2013.01); *G06F 3/1462* (2013.01); *G06F 16/252* (2019.01); *G06Q 20/201* (2013.01); *G06Q 30/0257* (2013.01)

(58) Field of Classification Search
CPC ............. G06Q 30/0269; G06Q 20/201; G06Q 30/0257; G06F 16/252; G06F 3/1462
See application file for complete search history.

(56) References Cited

U.S. PATENT DOCUMENTS

| | | | |
|---|---|---|---|
| 5,726,431 A | 3/1998 | VanDonkelaar et al. | |
| 6,897,763 B2 | 5/2005 | Schulmerich et al. | |
| 9,256,761 B1* | 2/2016 | Sahu ........................ | G06F 16/21 |
| 2014/0196083 A1* | 7/2014 | Du .................... | H04N 21/42204 |
| | | | 725/34 |
| 2014/0367956 A1 | 12/2014 | Wilkinson et al. | |
| 2017/0085445 A1* | 3/2017 | Layman ................ | H04L 43/045 |
| 2018/0101391 A1* | 4/2018 | Cunha ..................... | G06F 9/451 |
| 2019/0095974 A1* | 3/2019 | Wong ..................... | H04L 63/06 |

OTHER PUBLICATIONS

Walton, Informal Logic, 2008.*
Evans, Invisible Engines, MIT Press, 2006, pp. 37-46.*

* cited by examiner

*Primary Examiner* — Michael I Ezewoko
(74) *Attorney, Agent, or Firm* — GableGotwals

(57) ABSTRACT

A retail ticking system including a processing unit, a web services server for receiving sent messages from a terminal client device and delivering presentation data to the terminal, a credential server for receiving and verifying a processed credential access request, a profile management server for storing and retrieving user information, and a message broker adapted to receive and manage event messages.

23 Claims, 8 Drawing Sheets

APPARATUS FOR PRINTING, DISPLAYING, AND MANAGING DOCUMENTS, DIGITAL CONTENT, ADVERTISING, SOCIAL MEDIA, MOBILE CATALOGUES AND THE LIKE FOR RETAIL PREMISES, AND SYSTEM THEREOF

CROSS REFERENCE TO RELATED APPLICATIONS

This application claims priority to Australian Application No. 201990049 filed 2019 Jan. 8 which is incorporated herein by reference.

The present invention relates to an apparatus for printing, displaying, and managing documents, digital content, advertising, social media, mobile catalogues and the like, for retail premises, and, in particular, the present invention generally relates to an electronic apparatus or system for printing, displaying, and managing documents, digital content, advertising, social media, mobile catalogues and the like, such as shelf tag, advertisement, shop notice, for a retail shop.

BACKGROUND

Retailing is a competitive business. Researchers have found in a 2014 survey that 54.1 percent of shoppers nominated 'good value' as one of the factors that mattered most to them when shopping. A store with good value products can entice consumers to go into the shop premises and purchase other products there.

A typical grocery store may have 30,000 to 60,000 items available for purchase, of which around 4,000 or more may be promoted each week, particularly through the use of advertisement signs in the aisles of the store. This means that it requires to change at least 8,000 shelf tags and advertisement signs.

These advertisement signs are usually posted near the products being promoted, typically calling attention to a sale price or other information designed to attract the consumer to the product. The use of advertisement signage (or shelf talker) requires a significant amount of time to print, sort, and place the advertisement at the intended locations in the stores. In large chains, a centralized location may be used to print and sort the advertisement for each store, requiring additional time for sorting and delivering.

The Australian Consumer Law has stringent requirements on shelf labels. The prices displayed by a business must be clear, accurate and not misleading to consumers. If the retailer displays or advertises in a catalogue the same good with more than one price, the retailer must sell the good for the lowest displayed (or advertised) price or withdraw the goods from sale until the price is corrected. For some retailers there are additional legislative requirements to display the correct comparative unit price on price tickets and labels. Hence, it will take a significant amount of resource to ensure the price tags, advertisement signs, and catalogues coordinates with each other. Therefore, there is a need for an apparatus or system for printing, displaying, and managing shelf tags and advertisement signs for retail premises.

The U.S. Pat. No. 5,726,431 discloses a shelf tag printing system that includes a portable terminal in radio communication with a base station and a portable printer in wireless communication with the portable terminal. The portable terminal has a barcode scanner which reads product barcodes for radio transmission to the base station. The base station responds with informational signals indicating legends to be printed upon shelf tags by the printer. These signals are received by the portable terminal and relayed to the printer. Communication between the portable terminal and the printer is one-way via a surface wave acoustic resonator in the portable terminal and an amplifier sequenced hybrid receiver in the printer.

The U.S. Pat. No. 6,897,763 discloses a mobile retail signage management system includes a communication device capable of transmitting a specific location for which a corresponding sign needs to be positioned at the specific location; a portable workstation including a product database that associates product information with the specific location, wherein the product information includes display information for a corresponding sign positioned at the location. Moreover, the portable workstation communicates to the communication device as the portable workstation comes within the communication range of the communication device, wherein the communication range corresponds to the near vicinity of the portable workstation with respect to the communication device. A sign writer for imaging the corresponding sign in real-time, in the near vicinity of the specific location; and a computer network for updating the database are provided. Additionally, a clerk is alerted that the corresponding sign needs to be imaged and positioned at the specific location.

The US Published Patent Application No. 20140367956 discloses a system for using shelf labels, signs, and strips in a retail establishment. Some display materials disclosed include an ordered set of a plurality of individual display materials. Each of the individual display materials is releasably adhered to an adjacent individual display material in the ordered set, whereby forming a pad. The ordered set is printed in a predetermined sequence of installation for each of the individual display materials in a retail environment. In another embodiment, a pad of shelf labels includes a plurality of sheets and releasable adhesive. Each sheet includes a single shelf label having a unique combination of product-identifying indicia and price information, and the releasable adhesive adheres each sheet to an adjacent sheet in a stacked configuration. The sheets are ordered in a predetermined sequence of installation in a retail environment.

Any discussion of the prior art throughout the specification should in no way be considered as an admission that such prior art is widely known or forms part of common general knowledge in the field.

SUMMARY

It is an object for the present invention to provide a system or apparatus for printing, displaying, and managing tickets, labels, advertisements for retail premises.

It is another object of the present invention to provide an apparatus or system for managing and scheduling events or jobs for running an advertising campaign including printing physical display contents and digital display contents for a retailing shop or a chain of retailing shops.

It is another object of the present invention to provide an improvement of a retail ticketing system for managing and running an advertising campaign in retail premises.

It is, therefore, an object of the present invention to provide a new and novel retail ticketing system for managing and running an advertising campaign in retail premises.

Other objectives and advantages will become apparent when taken into consideration with the following specification and drawings.

It is also an object of the present invention to overcome or ameliorate at least one of the disadvantages of the prior art, or to provide a useful alternative.

It is, therefore, an object of the present invention to provide a retail ticketing system comprising:
- a processing unit associated with memory and queue;
- a web services server controlled by the processor for receiving event messages from a terminal client device and delivering presentation data to the terminal client device;
- a credential server controlled by the processor for receiving a processed credential access requests from the web services server, verifying the credential access requests, retrieving a credential token from a database, and passing the credential token to the web services server to generate a response to the terminal client device;
- a profile management server controlled by the processor for storing and retrieving user or store profiles, ticket templates, customer information to the database system;
- a message broker associated with the memory and queue, wherein the message broker is adapted to receive event messages, assign the event messages to a queue, and schedule to distribute the event messages to one or more working modules, including a ticketing module for printing tickets, a digital signage module for generating and distributing digital presentation to display devices; a mobile catalogue module for generating and streaming real-time catalogue; an online advertising module for generating advertisement in associated with social media application programming interface; a context advertising module for collecting consumer information to store in the database; and a business intelligence module for generating business reports.

Preferably, the ticketing system is adapted to print quality colour or mono shelf tickets or labels based on automated marketing rules, combined with intelligent templates, pricing, and promotional data.

Preferably, the pricing and promotional data can be retrieved from one or more of: Point of Sale System (POS), Back Office System (BOS), Enterprise Resources Planning System (ERP), store or back office database systems and combined with additional marketing information and images.

Preferably, the tickets or labels are printed by a managed print service that is adapted to optimise the cost per page independent to toner consumption.

Preferably, the tickets or labels are printed on a range of plain paper, perforated paper or pre-printed paper and displayed in POS display products such as clear semi-rigid pockets attached to shelves with clips.

Preferably, the digital signage system is adapted to generate unique, store-centric digital signage contents, with real-time store pricing and offers.

Preferably, the digital signage system is adapted to provide full creative control to a remote headquarter terminal for scheduling and executing digital content across store networks.

Preferably, the digital signage system is adapted to generate quality digital signage based on automated marketing rules combined with intelligent templates and pricing and promotional data.

Preferably, the digital signage system is adapted to remotely manage a plurality of display screen for displaying digital signage contents.

Preferably, the display screen comprises a commercial grade screen or a video wall with any mounting bracket.

Preferably, the mobile catalogue system is adapted to compile responsive personalised store catalogues for streaming pricing retrieved in real-time from the POS or BOS to mobile devices.

Preferably, the mobile catalogue system is adapted to compile a responsive personalised store catalogue based on location information of a mobile device.

Preferably, the online advertisement system is adapted to generate targeted online advertisement or content for social media news feeds. The content is automatically generated based on merchandising rules and dynamic templates and published.

Preferably, the contextual advertisement system is adapted to combine customer images generated by facial recognition algorithm, location data generated by proximity beacons, and customer purchasing history received from loyalty programs to create customer profiles.

Preferably, the contextual advertisement system is adapted to analyse and track customer's journeys within a store in accordance with the customer profiles.

Preferably, the business intelligence module is adapted to generate correlation data based on an amount of sale of a product and a frequency of advertisement of the product across from a group of stores down to individual customers.

Preferably, the business intelligence module is adapted to create automated targeted merchandising content generation across all retail advertising channels.

Preferably, the retail ticketing system further comprises a context store for managing information and display of a store by assigning a permission token to each user, wherein the permission token comprises different levels of access in a store-based hierarchy.

Preferably, the permission token is assigned to a user when the user logins to the system.

Preferably, the context store is adapted to determine a store which the user has permission to access and with reference to user selected input if the user has permission to access to more than one store.

Preferably, the permission tokens are firstly grouped together in accordance with the role attribute.

Preferably, when a user has a role attribute assigned, a permission token will be granted with permissions to access associated with this role.

Preferably, the role attributes are customisable and set up as part of an onboarding process for each new customer such that each of the actual roles of employees within that company has a corresponding role attribute.

Preferably, the permission tokens are recorded in a logging table for tracking or auditing user activities.

Preferably, the pricing and promotional data can be retrieved with push application programming interfaces (APIs), pull application programming interfaces, or data agents.

Preferably, the retail ticketing system further comprises a local database system adapted to store in a series of predefined tables comprising of some common columns across all customers and a column called head-doc.

Preferably, the head-doc column is adapted to store files of data in a JavaScript Object Notation (JSON) structure or Extensible Markup Language (XML) structure, wherein the data does not fit into a standard schema.

Preferably, each of the predefined tables comprises primary keys being a unique value by which a single record can be identified.

Preferably, the retail ticketing system further comprises a difference engine module, wherein the difference engine module is adapted to accept a customisable script file within an implementation layer that allows integrators to perform customer-specific business logic whenever an entity within the database changes Preferably, the customer specific logic comprises the step of receiving a copy of the entity that was changed, an old head-doc, and a new head-doc to determine which specific data attributes have changed, including previous values and current values, and if the change is deemed relevant to a business rule.

Preferably, the ticketing system is adapted to allow the design, maintenance, rendering, and revision control of dynamic templates through a ticket design interface.

Preferably, the ticketing system is adapted to define a set of design rules associated to a dynamic template such that the ticketing system will verify the compliance of the design rules when a user designs a ticket.

Preferably, the design rules comprise an electronic predicate instruction regarding one or more attributes of: theme, article content, colour, background, font, styling, inclusive or exclusive of additional information, disclaimers, and additional content change.

Preferably, the ticketing system is adapted to digitally sign a dynamic template which has been authorised by a user through the ticket design interface for rendering a non-editable template file to store in a remote database.

Preferably, the ticketing module is adapted to display a preview representation of the proposed printed ticket with the ticket design interface.

Preferably, the ticketing module is adapted to assign a unique version number to each dynamic template.

Preferably, the local database system is adapted to conduct a digital search query of a distributed or multitenant-capable full-text search function with an HTTP web interface and schema-free JSON or XML documents.

Preferably, the retail ticketing system further comprises a printing management interface is adapted to forward a print job to a printing registry, wherein the printing registry comprises a first-in-first-server queuing facility from where batches of print jobs can be executed.

Preferably, the printing registry is adapted to receive print jobs from an input stream, wherein the input stream comprises one or more of the events and difference engine, local database system, an external comma-separated values file, a terminal system, or an ad hoc print job interface.

Preferably, the printing management interface is adapted to forward a print job to a printing device based on a location generated with reference to one or more article information on a ticket to be printed.

Preferably, the printing management interface is adapted to only send the changed content to reduce network bandwidth.

Preferably, the printing registry comprises an open queue memory module and a completed queue memory module, such that a print task will move from the open queue memory module to the completed queue memory module after the print job is executed.

Preferably, the printing management interface is adapted to change a priority order of a print job.

Preferably, the printing management interface is adapted to move a print job from the complete queue memory module to the open queue memory module for re-print.

Preferably, the printing management interface is adapted to select and copy an item of a print job and create a new print job with the selected item.

Preferably, the retail ticketing system further comprises an interface for monitoring events and activities in the system, wherein the events and activities comprise any one or more of: current or scheduled digital signage contents on the display screens in different locations, current staff roles, and the corresponding permissions.

Preferably, the digital signage contents comprise one or more boards, each of which has a priority level, such that the cast interface is adapted to re-define or change the priority level of a board.

Preferably, the digital signage module further comprises a display scheduler for determine an order, start time, end time, and duration in which the boards to be displayed on the display screens.

Preferably, the display scheduler is adapted to schedule a default digital signage content in the event that there is no scheduled digital signage content.

Preferably, the display scheduler is adapted to generate a visual representation of priority rules display the scheduled digital signage contents.

Preferably, the display scheduler is adapted to provide a record log of the displayed signage contents for calculating an effective rating of an advertising campaign.

Preferably, the business intelligence interface is adapted to retrieve events and activities data to generate one or more activity report.

Preferably, the business intelligence interface is adapted to send notifications to users, display a notification, and display a list of notification sent.

Preferably, the business intelligence interface is adapted to grant remote client terminals accesses to documents and files within a store-based hierarchy.

Preferably, the documents and files are stored in customisable user-defined folders in a digital network file system.

Preferably, the business intelligence interface is adapted to create a metadata file for storing a version number and permission token for each document or file which can be accessed through a dashboard user interface.

Preferably, the business intelligence interface is adapted to extract and process custom properties on entities to collect metadata and updates business rules.

Preferably, the dynamic template for rending is a digital file compiled with Hypertext Markup Language version 5 (HTML5) format or Extensible Markup Language (XML) format adapted to combined with data retrieved from back office database or local database system.

Preferably, the ticketing system comprising a printing device associated with a message broker for receiving printing events from terminal systems, and the message broker is adapted to schedule and distribute printing tasks to available printing devices.

Preferably, the message broker is adapted to distribute printing tasks in accordance with a signal received from a printing device Preferably, the message broker comprising a plurality of workers Preferably, the retail ticketing system comprises a plurality of Representational State Transfer (REST) Application Programming Interface (API) for the integration with other computing platforms.

Preferably, the REST API has one or more social media API for rendering and submitting digital contents to social media platforms.

Preferably, the REST API has one or more mobile device API for rending and submitting digital contents using mobile-friendly templates.

BRIEF DESCRIPTION OF THE FIGURES

Features and advantages of the present invention will become apparent from the following description of embodiments thereof, by way of example only, with reference to the accompanying drawings, in which.

DESCRIPTION OF THE INVENTION

Figure 1:
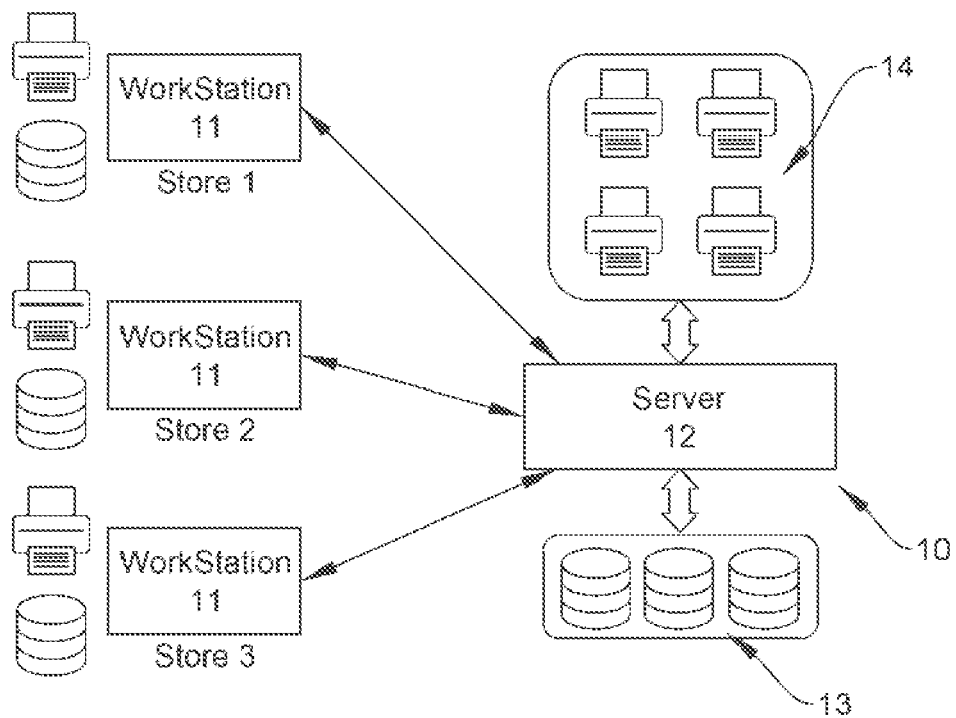
FIG. 1 shows a schematic diagram of a retail ticketing system for printing, displaying, and managing documents, digital content, advertising, social media, mobile catalogues and the like for retail premises according to an embodiment of the present invention.
Figure 2:
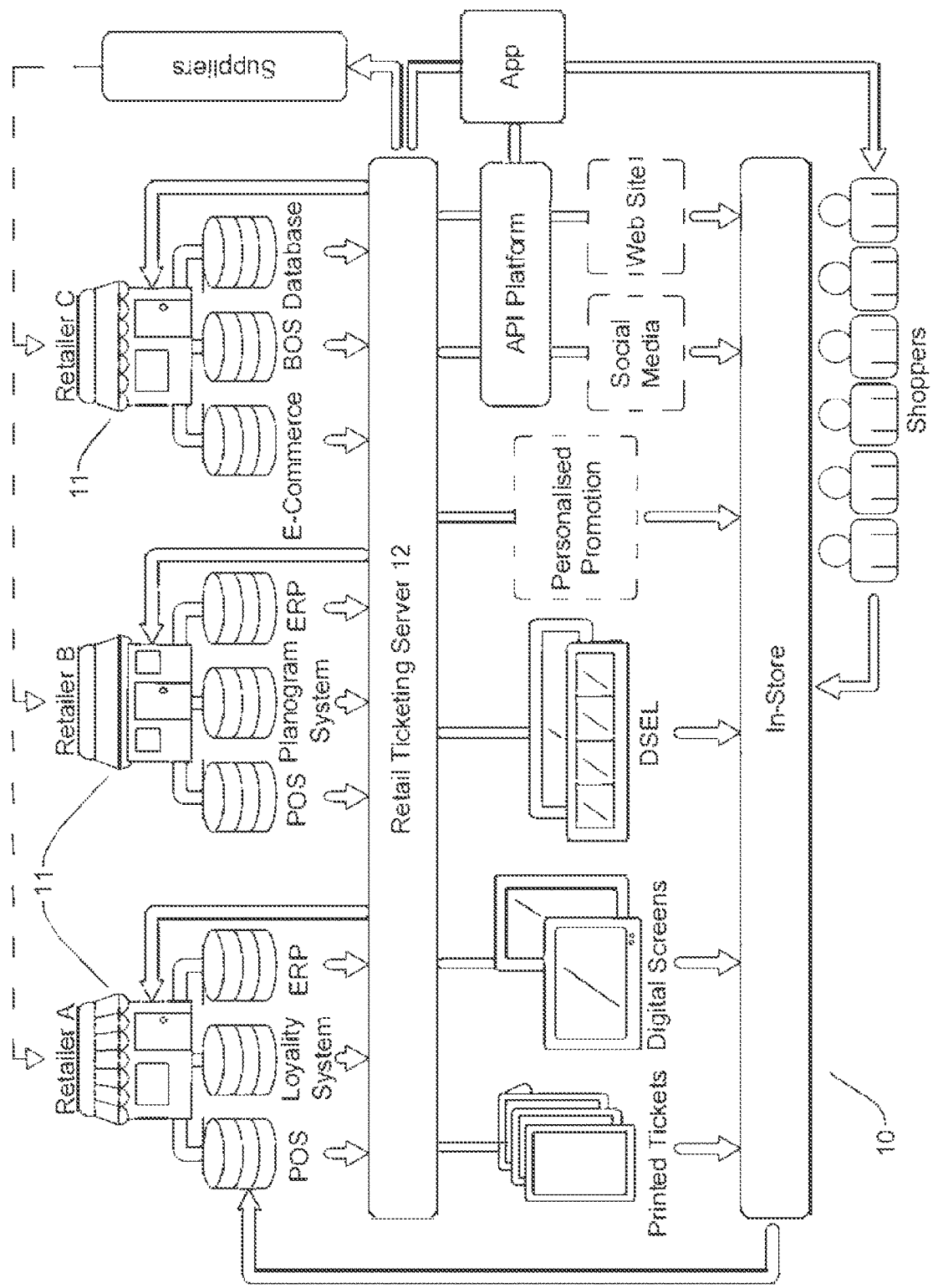
FIG. 2 shows another schematic diagram of a retail ticketing system of FIG. 1.

Reference is now made to FIGS. 1 to 8A-8B showing a preferred embodiment of the present invention. FIG. 1 shows a schematic side view of a Retail Ticketing System 10 for printing, displaying, and managing documents for retail premises comprising workstation 11 located in a shop or office. The workstation 11 of each shop or office will usually have a local printer and database system for storing local data.

The workstation 11 of each shop or office is also in communication with a Retail Ticketing Server 12. The Retail Ticketing Server 12 is in associated with a database system 13 which stores product and customer information responsive to queries generated by workstation 11. The Digital Signage Server 12 is also associated with a remote printing system 14 for executing print jobs request by the workstation 11.

In one embodiment, the workstation 11 comprises a customised digital signage interface allowing a user to generate print jobs to the Retail Ticketing Server 12. The workstation 11 allows a user to login to the digital signage interface with a credential. The workstation 11 will process the credential by securing and encrypting the contents to a secured package. On receiving the secured package, the Retail Ticketing Server 12 will send an access token to the user and allow the user to access the permitted contents.

In one embodiment of the present invention, the Retail Ticketing Server 12 is an enterprise-class, cloud-based Software as a service platform. It is an advanced print and digital advertising system that delivers the performance, security, usability and business agility required by even the largest retailers.

Figure 3:
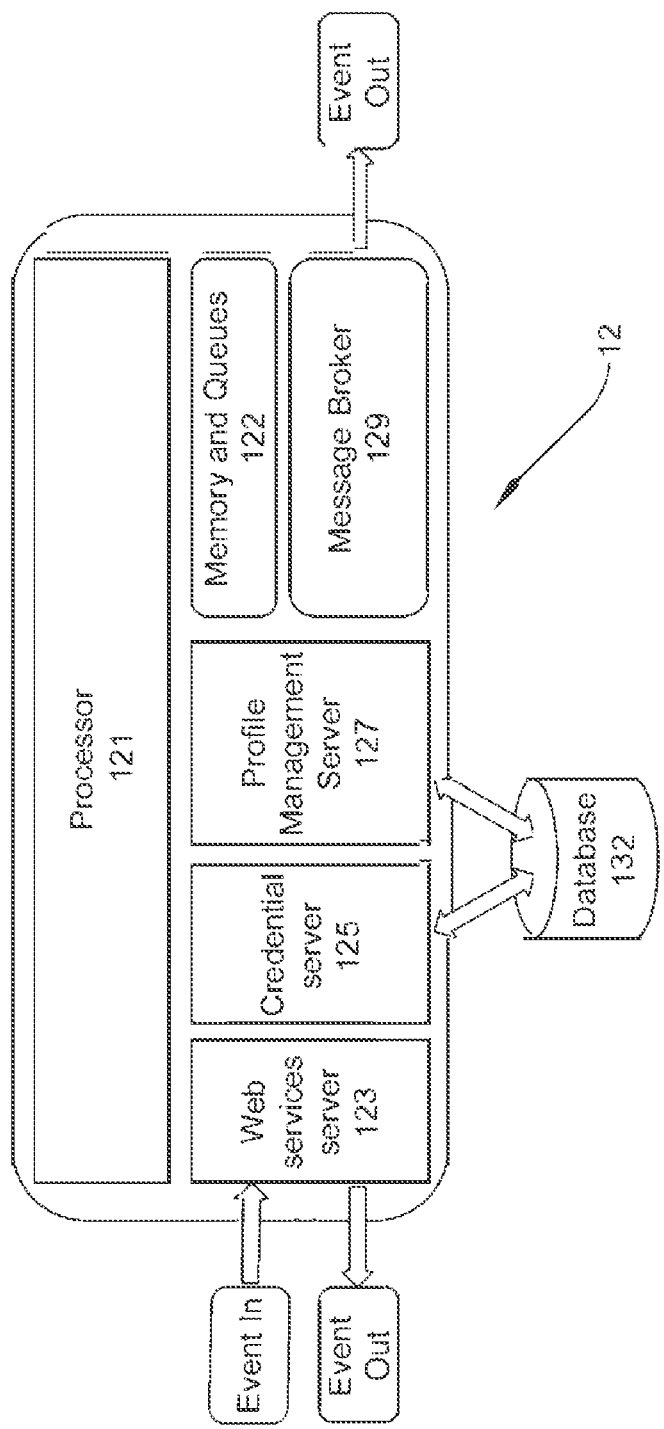
FIG. 3 shows a schematic diagram of a retail ticketing server of the retail ticketing system of FIG. 1.

Referring to FIG. 3 which shows a schematic diagram of a retail ticketing server 12 in an embodiment of the present invention. The retail ticketing server 12 comprises a processor 121 and memory 122 to control a number of subsystems. These subsystem includes a web service server 123 for receiving requests, such as an input event, and sending out responses, such as output event. The input event may be a hypertext transfer protocol request, message, extensible mark-up language request, or JavaScript objection notion request, etc.

The processor 121 will handle the input events. For example, if the event is a user requesting a credential token for accessing the system, the processor 121 will extract the data from the request, and call on the application programming interfaces (APIs) of the credential server 125. The credential server 125 will be responsible for handling any credential requests. In one embodiment, the credential server 125 is adapted to a lightweight directory Access Protocol server from searching and retrieving credential of a user. The credential server 125 is adapted to retrieve the credential token and pass on to the processor 121 for packaging a message payload. The processor 121 will wrap the message payload to an output message or event. The output message or event will then pass onto the web services server 123 to forward the output message or event to the user. In one embodiment, the web services server 123 comprises a hypertext transport protocol server and an enterprise transaction processing server, such as WebLogic or JBoss.

Figure 7:
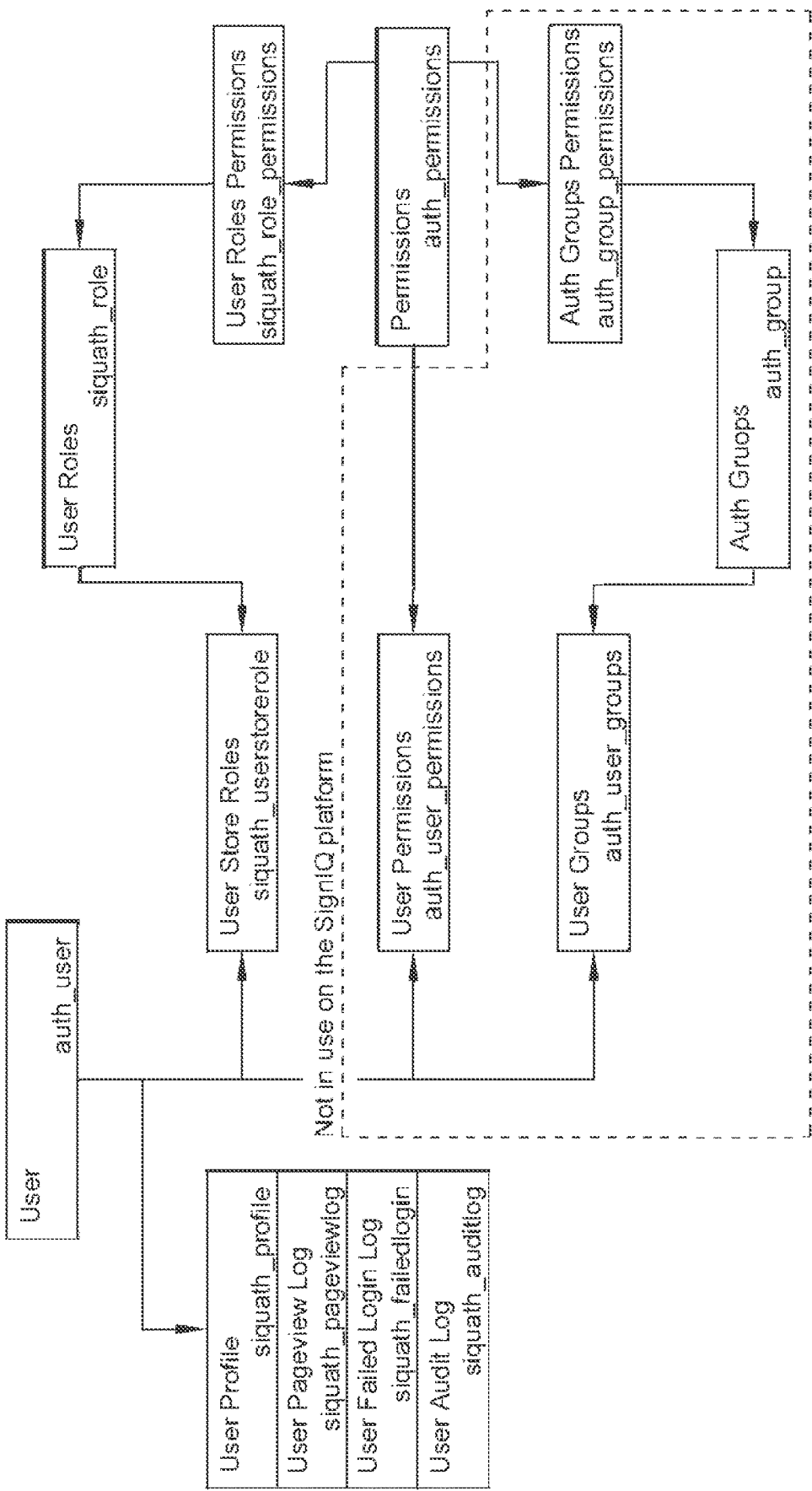
FIG. 7 shows a schematic diagram of a schema of users, roles, and permission data structure defined in the retail ticketing system of FIG. 1.

Reference is now made to FIG. 7 which illustrates a schematic diagram of a schema of users, roles, and permission data structure defined in the apparatus of an embodiment of the present invention. With the access token, the digital signage interface will able to identify the user, access the user profile, user page view log, user failed view log, and user audit log. In one embodiment of the present invention, the user profile, and these log file will be stored in the local database system and synchronised with the database system regularly. The profile management server 127 is adapted to handle the user profile, data, template, and information. When a user (can be a store manager or operator) need to create labels, the user may send a request through the terminal. The web services server 123 will generate presentations based on the request, profile, data, template, and information, and send the response to the terminal through the web services server 123.

In one embodiment, the input event is a printing request. The processor 121 will pass the request to the message broke 129. The message broker 129 will put the printing request to a queue and find the most suitable printer in the printing pool 14 to handle the printing request. Then the message broker will send the printing request to the suitable printer and send a reporting message back to the user through the web services server 123.

The message broker 123 is responsible for queuing and distributing. The message broker 123 is able to reduce the load of large transactions on the retail ticketing system 10. The message broker 123 adopted a transaction queuing method for scheduling the printing requests. In one embodiment, the Server 123 comprises a message broker, such as RabbitMQ, and workers, such as Celery, to queue transactions, and to execute them as resources are available.

The message broker 123 in accordance with one embodiment of the present invention is a general purpose message broker, employing several variations of a point to point, request/reply and pub-sub communication style design patterns. The message broker 123 adopted a smart broker/dumb consumer model, focused on consistent delivery of messages to consumers that consume at a roughly similar pace as the broker keeps track of consumer state. However, other models can also be used for scheduling and distributing printing requests.

The workers comprise an asynchronous task queue/job queue based on distributed message passing. It is focused on real-time operation, but supports scheduling as well. The execution units, called tasks, are executed concurrently on a single or more worker servers using multiprocessing, Eventlet, or gevent. Printing request tasks can execute asynchronously (in the background) or synchronously (wait until ready).

Figure 4:
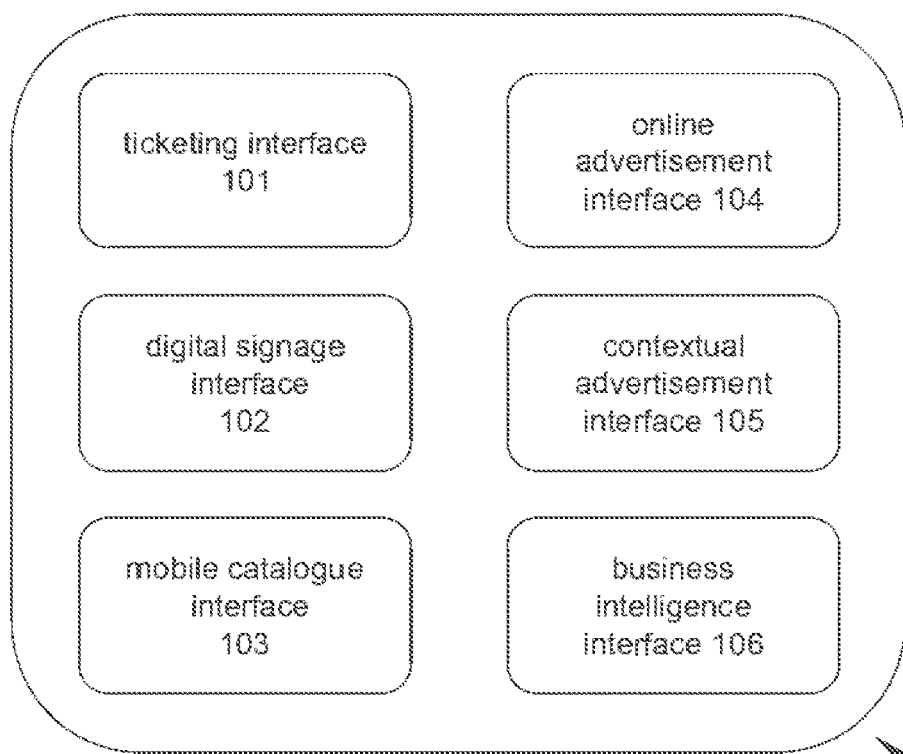
FIG. 4 shows a schematic diagram of a retail ticketing client of the retail ticketing system of FIG. 1.

In one embodiment, the terminal comprises a customised client application or Retail Ticketing Client 100 as shown in FIG. 4 for displaying the presentations to a user. The user may interact with the presentations through the Retail Ticketing Client 100 for changing the look and feel of tickets and labels to be printed, . . . , etc. In another embodiment, the presentations are displayed through a web browser.

FIG. 4 shows an embodiment of the present invention, there is provided a Retail Ticketing Client 100 residing on the workstation 11 for printing, displaying, and managing documents. The Retail Ticketing Client 100 is a customised application residing on the workstation 11I inside a retail premises or office. The Retail Ticketing Client 100 provides a user interface for a user to interact with the Retail Ticketing System 10, such as sending labels or ticket printing jobs, scheduling online or in-store advertisement, retrieving business reports, etc.

In one embodiment of the present invention, the trailing ticketing client 100 comprising a ticketing system 101, a digital signage system 102, a mobile catalogue system 103, an online advertisement system 104, a contextual advertisement system 105, and a business intelligence system 106.

The ticketing system 101 of the present invention, improves the in-store customer experience by providing customers with useful product information, as well as increasing unplanned purchases by presenting the best promotional message on offers based on our automated design rules.

The ticketing system 101 is adapted to print quality colour or mono shelf tickets, tag, or labels based on automated marketing rules, combined with intelligent templates, pricing and promotional data from store or back-office systems (BOS).

The ticketing system 101 is also adapted to integrate with the Point of Sale System (POS) or back office system, (BOS). Pricing and promotional data can be drawn directly from the POS, BOS, Enterprise Resources Planning (ERP), or other database systems and combined with additional marketing information and images.

In one embodiment, the ticketing system 101 can provide affordable colour printing via a range of printers on a Managed Print Service. Typically, the Managed Print Service is a remote printing service which delivers a fixed, low cost per page regardless, regardless of the amount of toner used.

In another embodiment, the ticketing system 101 can provide a range of perforated paper and POS display products including clear semi-rigid pockets and clips to ensure the best in-store presentation.

The digital Signage System 102 of the retail ticketing system 10 for printing, displaying, and managing documents for retail premises of the present invention is adapted to automatically generate unique, store-centric digital signage content, with real-time store pricing and offers. The digital Signage system 102 allows individual stores the freedom to choose which offers to advertise on screens. Alternatively, it allows for Head Office to have full creative control, scheduling and executing digital content across store networks.

The digital Signage System 102 allows the user to easily cast quality digital signage based on automated marketing rules combined with intelligent templates and pricing and promotional data from in-store systems and back-office systems.

The digital Signage System 102 can also be integrated with the POS or BOS systems. Pricing and promotional data can be drawn directly from the POS, BOS, ERP and other database systems and combined with additional marketing information and images.

The digital Signage System 102 comprises an interface to users with the tools to seamlessly manage the entire fleet of screens. Everything from diagnostics to scheduling is included in the solution.

Figure 5:
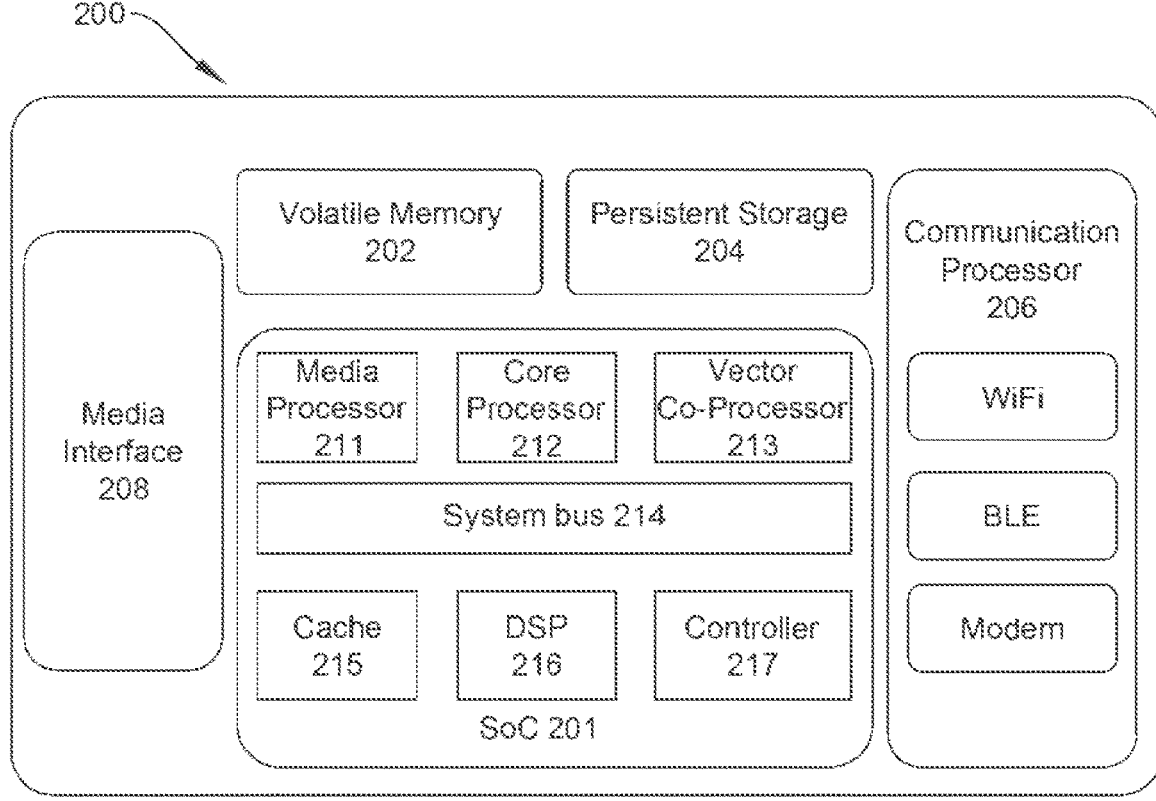
FIG. 5 shows a schematic diagram of a digital signage adapter of the retail ticketing system of FIG. 1
Figure 6:
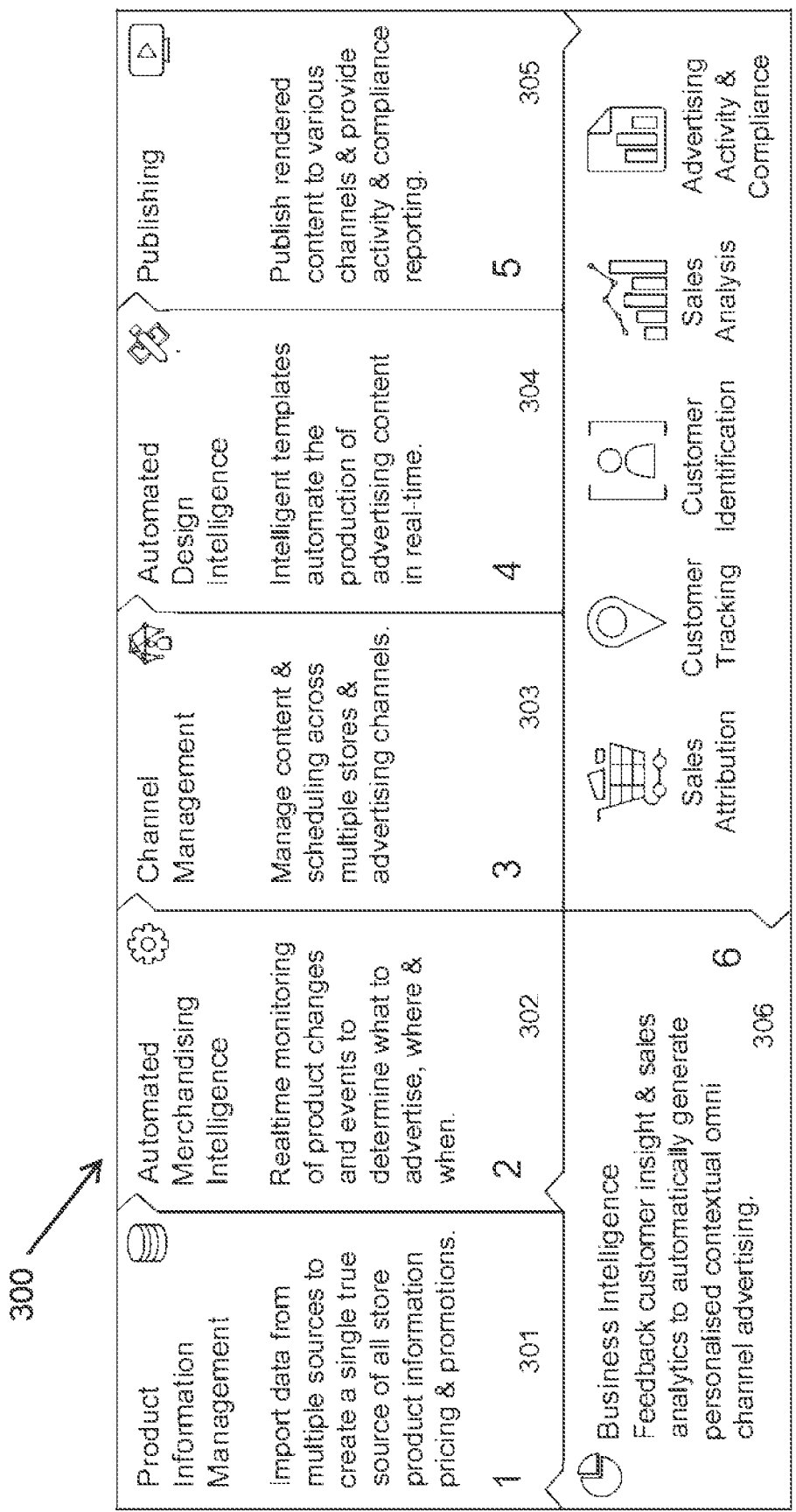
FIG. 6 shows a schematic diagram of a retail ticketing application for the retail ticketing system of FIG. 1.

The digital signage system 102 comprises screens, video walls and mounting brackets to provide a holistic digital signage solution for a business. In one embodiment, the digital signage system 102 comprises a digital signage adaptor 200 for retrofitting to a commercial television such that the commercial television can be integrated as part of the retail ticketing system 10. Referring to FIG. 5, the digital signage adaptor 200 comprises a System-on-Chip processor 201, a volatile memory 202, a persistent storage, a communication processor 206, and a media interface 208.

The System-on-Chip (SOC) 201 for the digital signage adaptor 200 of an embodiment of the present invention is a single integrated circuit comprising a media processor 211, one or more processing cores 212, a vector co-processor 213, memory cache 215, Digital Signal Processor 216, and input/output controller 217. The architecture of the SoC 201 for digital signage adaptor 200 can provide a faster and more compact system than the prior art.

The media interface 208 is adapted to connect directly to the commercial television. The digital signage adaptor 200 is adapted to receive messages from the Retail Ticketing Server 12, process the message, and generate output media for transmitting to the commercial television. In one embodiment, the media interface 208 is a High-Definition Multimedia Interface (HDMI) for transmitting uncompressed video data and compressed or uncompressed digital audio data from the digital signage adaptor to the commercial television.

In one embodiment, the volatile memory 202 of the digital signage adaptor 200 comprises a low voltage double data rate synchronous dynamic random-access memory and preferably the type three or four memory. The persistent storage 204 comprises an embedded Multi Media Card or a solid-state drive.

The digital signage adaptor 200 also has a communication processor 206 for handling data communication with the digital signage server 12. The communication processor 206 is customised with a number of stacks and queuing buffer for handling data packets for reducing the load of the SoC. The communication processor 206 of the digital signage adaptor 200 comprises a Wi-Fi communication circuit for handling Wi-Fi communication, a Bluetooth communication circuit for handling Bluetooth communication, and a modem for handling cell phone communication.

In one embodiment of the present invention, a user at the workstation 11 uses the retail ticketing client application 100 to prepare a number of advertisement to display in a shop with a number of televisions on different aisles at a predefined time interval. The user can prepare the advertisement with the digital signage interface 102. The digital signage interface 102 can connect to the local database and remote database 13 through the retail ticketing server 12 to retrieve the shop advertising template to assist the creation of advertisement. The digital signage interface 102 will also coordinate the retail ticketing server 12 to obtain the products data, such as product name, brand, current price, etc. The digital signage interface 102 can also assist the user to derive any discount and promotion based on the products data retrieve to prepare the advertisement.

Once the user has done with the preparation of the advertisement, the user may schedule the location (shop, aisle, etc) and even schedule a print job for printing labels and tickets for the advertising campaign. The retail ticketing client application 100 will then generate the advertising event messages and printing event messages and forward them to the retail ticketing server 12.

On receiving these advertising events and printing events, the message broker 129 of the Retail ticketing Server will put them in the queue. The message broker will be responsible for distributing the printing events to the printers in printing pool 14 in order to ensure the print job will finish before the campaign scheduled time. The message broker 129 will hold the advertising event in the queues until the advertising schedule begins. When the advertising schedule begins, the message broker 129 will forward the advertising event messages to the digital signal adaptors 200 or digital signal displays for presenting the advertisement in the designated location at the designated time.

The mobile catalogues interface 103 is adapted to create responsive personalised store catalogues capable of streaming live pricing and offers to customers' mobile devices. The system for printing, displaying, and managing documents for retail premises 10 of the present invention can bring the in-store experience of store-based offers, pricing, and product discovery directly to customer mobile devices, with pricing and offers kept up-to-date directly from the POS or BOS. Once a personalised store catalogue is created, the mobile catalogues interface 103 of the retail ticketing client 100 will generate an advertising event message and forward the advertising event message to the retail ticketing server 12. The message broker 129 of the retail ticketing server 12 will be responsible for distributing the personalised store catalogues to a consumer in the shop.

The online advertisement interface 104 is adapted to generate targeted online advertisement or content for social media news feeds. The content is automatically generated and published based on merchandising rules and dynamic templates. These merchandising rules and dynamic templates are typically stored in the local storage attached to the workstation 11 or the remote database system 13. The retailer server 12 will check and verify the user credential token before allowing the access of the merchandising rules and dynamic templates. Through the merchandising rules and dynamic templates, the user may generate targeted online advertisement or content for social media news feeds, and specify the time for the publication. The online advertisement interface 104 will then generate the advertising event message and forward it to the retail ticketing server 12. The message broker 129 of the retail ticketing server 12 will put the advertising event message in the queue and schedule for execution. When the scheduled time is due, the message broker 129 will instruct the web services server 123 to publish the online advertisement on the website. For social media, the web services server 123 will invoke the application programming interface of the social media website, such as the Facebook APIs, Twitter APIs, or Instagram APIs, to publish the advertisement contents.

The contextual advertisement interface 105 is adapted to use a combination of facial recognition, proximity beacons, and loyalty programs, to build unparalleled customer profiles. By understanding and tracking the customers' journey within the store right through to the checkout, the system for printing, displaying, and managing documents for retail premises 10 of the present invention can tailor the content of in-store digital and mobile advertising to the customer. The tracking system comprises the closed circuit cameras in the shops and application (apps) installed on the consumer mobile device.

The business intelligence interface 106 is adapted to measure the effectiveness of the marketing and advertising campaigns across a group of stores down to individual customers. These results can inform the business intelligence system 106 of the system for printing, displaying, and managing documents for retail premises 10 of the present invention to create automated targeted merchandising and content generation across all retail advertising channels. The business intelligence interface 106 allows the user to perform big data analysis to generate business reports for assisting the user to make informed decisions on the advertising campaign.

The retail ticketing server 12 comprises retail ticketing application 300. The retail ticketing application comprises a core set of functionalities that provides the high-level modules as shown in the schematic diagram of FIG. 6. In one embodiment, the high-level modules comprise one or more of a product management module 301, an automated merchandising intelligence module 302, a channel management module 303, an automated design intelligence module 304, a publishing module 305, and business intelligence module 306. Each of these modules as a plurality of application programming interfaces such that the functionalities can be invoked locally or remotely.

The product management module 301 is adapted to import data from multiple sources, such as the store workstation databases, remote database system 13, Internet, and other Enterprise Resources Planning databases, to create a single true source of all store product information, pricing, and promotion.

The automated merchandising intelligence module 302 is adapted to perform real-time monitoring of product changes and events to determine what to advertise, where, and when. The automated merchandising intelligence module 302 is supported by the message broker 129 for scheduling the advertising event and printing event. The automated merchandising intelligence module 302 is adapted to receive notification from the resources, such as printers, display television, digital signage adaptor 200, etc informing their availability. The automated merchandising intelligence module 302 will then take different strategies to optimise the schedule of the event. For example, the optimisation strategy may include round robin, First-In First-Out, Last-In First-Out, load balancing, etc. In one embodiment, the automated merchandising intelligence module 302 is adapted to use machine learning strategy to learn the job event patterns for optimising the utilisation of the message broker 129.

The channel management module 303 is adapted to manage content in scheduling across multiple stores and advertising channel. The automated design intelligence module 304 is a management system for intelligent templates automation. It can manage the production of advertising content in real-time.

The publishing module 305 is adapted to render and publish contents to various channels and provide activity and compliance reporting. These channels may include display system in the shops, digital billboard, social media, entertainment systems, or even in virtual reality world.

The business intelligence module 306 is adapted to receive feedback, customer insight, and then performs sale analytics to automatically generate personalised contextual omni-channel advertising.

In addition to the above modules, the retail ticketing application 300 also provides the functionalities of sale attribution, customer tracking, customer identification, sale analysis, advertising activity, and compliance.

The unique requirements of every customer are developed into a set of business rules and templates (visual layouts), which are them implemented on the retail ticketing application 300.

The basis for the assignment of access permissions in the retail ticketing system 10 of the present invention is the concept of a context store. On login, a user with multiple store access permissions must first select the store that user is about to access. Users with permission to access only one store, will have it selected automatically.

Only information regarding this store will be displayed by the retail ticketing client 100 on the workstation 11 by a user. This arrangement will ensure that no unauthorised access to information is provided to any user, and enable the user to have different permissions at different levels in a store-based hierarchy.

Following is an example for implementing the context store permission of an embodiment of the present invention. A user can have operational permissions at a store, and only reporting permissions at a head office or group level, with no permission at any other store.

Head Office (Role=No role assigned)
    NSW (Role=Reporting user)
        Store A (Role=Store manager)
        Store B (Role=No role assigned)
    VIC (Role=No role assigned)
        Store C (Role=No role assigned)
        Store D (Role=No role assigned)

Permissions allows access to a function, feature or page on the retail ticketing system of an embodiment of the present invention. As illustrated in the above snapshot of the code, permissions are firstly grouped together under a named role, called "User Store Roles". When a user is assigned to this Store Role, the user will be granted all the permissions associated with this role.

These roles are customisable and normally set up as part of the onboarding process for each new customer so that the role names align with the actual roles of employees within that company. An example of a schematic diagram for User, Roles, and Permissions database is shown in FIG. 7.

Once a user has been granted a role at a particular store, their activity within the system for printing, displaying, and managing documents for retail premises 10 of the present invention is tracked and audited via a number of audit logging tables. These tables capture which pages have been visited, failed login attempts and many other audit events.

In one embodiment of the present invention, the retail ticketing system 10 adopted a schema agnostic algorithm to integrate data.

In one embodiment of the present invention, retail ticketing system 10 is adapted to allow highly customisable to its different components. The prior art was unable to achieve such a high degree of customisation. In order to achieve such high degree of customisation, the retail ticketing system 10 is adapted to interact with multiple external data sources, including different Point of Sales (POS) systems which are used by the various retail customers. To gather the required information, the retail ticketing system 10 uses three different types of application programming interfaces to retrieve data.

In one embodiment of the present invention, the retail ticketing system 10 is adapted to use push APIs to collect data. The push APIs will induce external data sources to push data into the retail ticketing system 10 via a Secured Hyper Text Transfer Protocol (https) POST or GET method. One unique element of the retail ticketing system of the present invention 10 is that inbound data on the API is handled via a generic endpoint, such as a universal resources locator (URL). This API endpoint is capable of receiving multiple different types of data from different external sources, identifying the type and then processing via predefined parsers. This is usually configured for each customer as part of the onboarding/setup process after they sign up.

In one embodiment of the present invention, the retail ticketing system 10 is adapted to use pull APIs. The pull APIs will be invoked as scheduled tasks. To implement the pull APIs, the retail ticketing system is configured with one or more scheduled task that runs on any interval and login to a remote data source to collect the necessary data (e.g. pull CSV data from a remote FTP site). This is usually also configured for each customer as part of the onboarding/setup process after they sign up.

In one embodiment of the present invention, the retail ticketing system 10 is adapted to use data agent for data integration. The data agent is a small client-side application written in a computer language, such as Python (and is therefore cross-platform). The data agent is used in situations where a push/pull from a central data source is not possible because each store in the retail network maintains their own store-specific data, e.g. data maintained in the stores own point of sale database.

The data agent is continually enhanced by the retail ticketing system 10 of the present invention to interact with more and more point of sale systems and has a mapping, or understanding, of the database structure of each sale system. The data agent is adapted to run queries to process data on any interval and uses the secure protocol API to push that store specific data back to the retail ticketing server 12 and save it against that specific store.

In one embodiment, the business intelligence module 306 of the retail ticketing application 300 is adapted to decide which of the push APIs, pull APIs, or data agent to use for collecting data. The business intelligence module 306 will learn the type of the POS system it is targeting by comparing the system fingerprint that POS system and that of the other similar POS system. Sometime the business intelligence module 306 may use more than one type of APIs to collect data from a single POS system.

Once the data for collection has arrived at retail ticketing system 10, the data is stored in a series of predefined tables which comprise of some common columns across all customers and a column called the head-doc. This column contains a JSON structure or XML structure capable of storing the data which does not fit into the predefined standard schema, and can be adapted to a unique customisable data structure. This structure is based on the customer's existing data source in order to enhance familiarity and for quicker onboarding.

In an embodiment of the present invention, every database table has its own primary key, and is the unique value by which a single record can be identified. Additionally to this, and as an optional prerequisite, certain tables have been identified where the external data source's primary key, which is referred to as the variable customer_pk, is also stored. With this value, the retail ticketing system 10 can easily reference and match any imported information to the source data received.

With the exception of a few common database fields, most of the remaining information for products and promotions is stored in the head-doc as attributes supporting a schema agnostic approach. An example of the head-doc structure is illustrated below:

Example JSON Head-Doc

```
{ 'attributes': {
    'Article Type': 'Cheese',
    'Base Unit Of Measure': 'KG',
    'BestBeforeDate': '2018-08-31',
    'Brand': 'J',
    'Carton Quantity': '1',
    'Comparative SizeA': '1',
    'Comparative SizeAu Country': 'A',
    'Comparative SizeAu UoM': 'KG',
    'Comparative SizeNz': '1',
    'Comparative SizeNz Country': 'NZ',
    'Comparative SizeNz UoM': 'KG',
    'Country of Origin': 'Product of Australia',
    'Item EAN': '0232125001512',
    'Item Number': '710268',
    'Long Description': 'Greek Kasseri Special',
    'Mandatory Warning': 'Contains Egg',
    'Master Size': '1.00',
    'Master Size UoM': 'KG',
    'PLU Code': '2183',
    'Parent ItemID': '710268',
    'PrintPackedDateIndicator': 'N',
    'PrintPackedTimeIndicator': 'N',
    'Product Ingredients 1': 'Ingredients: Salt, Rennet,',
    'Product Ingredients 2': 'contains Pasteurised Milk.',
    'Product Ingredients 3': 'May contain traces of Gluten,Crustacea, Egg,',
    'Product Ingredients 4': 'Peanuts, Soybeans, Sulphites and Sesame Seed.',
    'Short or Basic Description': 'Greek Kasseri',
    'Storage Requirements': 'Store in cool place',
    'Tax Classification A': '1',
    'Tax Classification NZ': '1',
    'Unit Of Measure': 'KG'
    },
'model': {
    'category': 'GOATS CHEESE (406742615)',
    'category_id': 65438,
    'display_name': 'Greek Kasseri Special',
    'visible_at_store': 1
    },
'siq8type': 'article',
'ticketing_defaults': { }  }
```

Every time an article, article store, article price, article store price, or promotion is updated (including the head-doc), a new revision is created so that the changes to these entities can be tracked and audited.

Figure 8A:
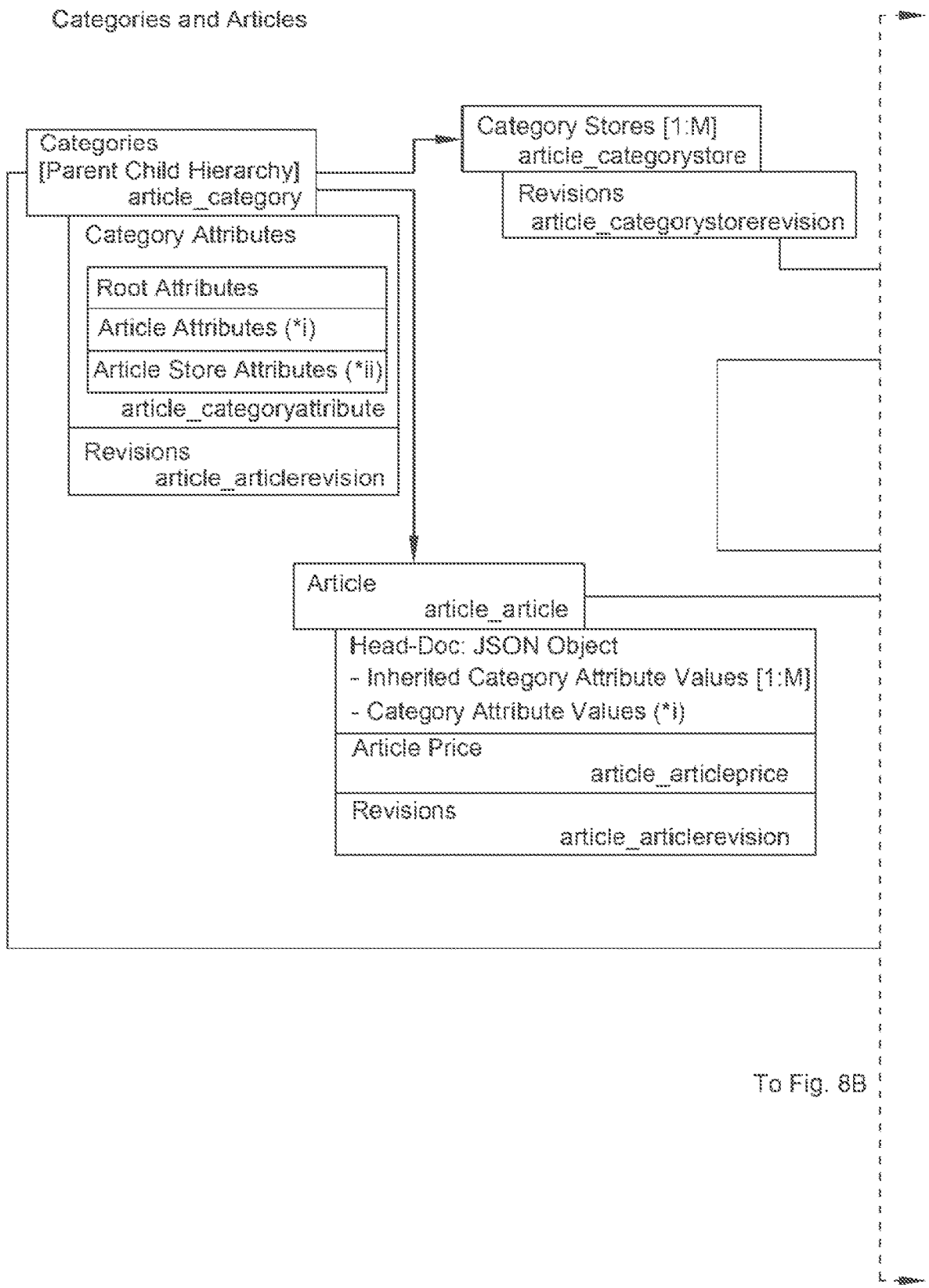
FIGS. 8A-8B show a schematic diagram of a schema of categories and articles data according to the first preferred embodiment of the present invention.
Figure 8B:
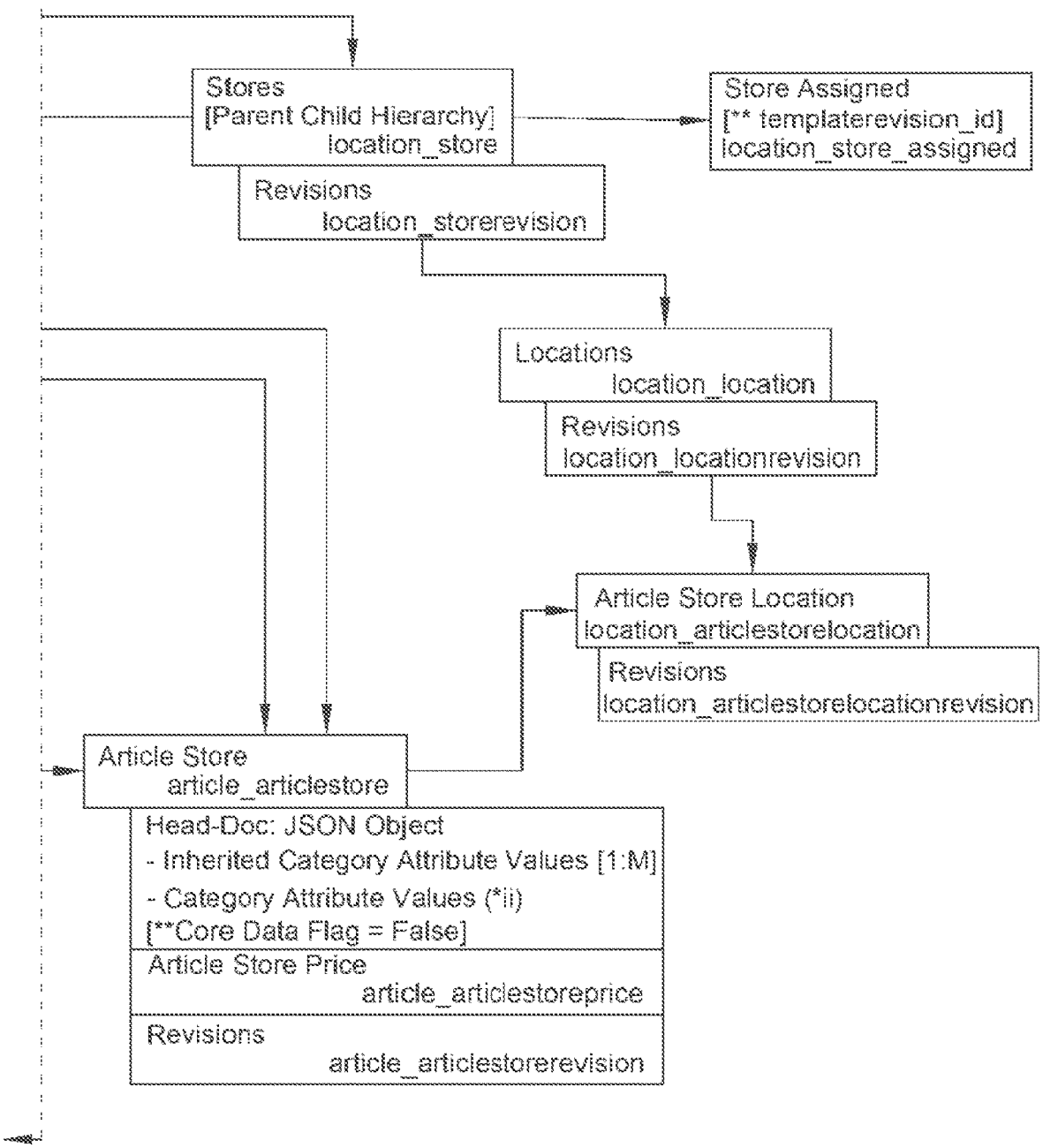

An example of the Categories and articles data schema is shown in FIGS. 8A-8B. The schema diagram of FIGS. 8A-8B (ref. "Categories and Articles") outlines which tables have head-docs and which tables are therefore capable of storing schema agnostic data and revisions.

In one embodiment of the present invention, the retail ticketing application 300 further comprises a difference engine module. The difference engine module is adapted to accept a customisable script file within the implementation layer of the retail ticketing application 300 that allows integrators to perform customer-specific business logic whenever an entity within the database changes (e.g. an external data source has pushed a new price for an article to the API).

As soon as the new data is committed to the database, the difference engine module's_event( ) hook is called by the retail ticketing application 300. If custom business rules have been defined for this customer, that logic is executed and is given a copy of the type of entity that was changed (the model), the old head-doc, and the new head-doc. These three parameters allow the difference engine module to determine which specific data attributes have changed, including what the value was before and after the change, and if the change is deemed relevant to a business rule. Depending on this evaluation, a number of results can be triggered, including but not limited to:

Batching a new ticket on the dashboard for one or more stores (e.g. because the price has changed)

Updating some digital content that is playing on a TV in-store

Sending an email or other notification to predefined recipients

The retail ticketing system 10 of an embodiment of the present invention for ticketing is the design, maintenance, rendering and revision control of dynamic templates. This function is delivered and controlled by the automated design intelligence module 304 of the retail ticketing server 12. New layout requests can be received with different levels of detail. This will broadly outline what a ticket should look like, and also what information should be displayed on each ticket. Customers can enforce strong branding guidelines or they can send a request to the intelligence module 304 of the retail ticketing system 10 to propose a new design. Typically, the retail ticketing client 100 provide the ticketing interface 101 for a user to administrate the design and send the request to the automated design intelligence module 304. These requests are turned into workable, dynamic system templates.

The creation of the templates will not only include the basic design of each ticket, but will also include a set of predefined business rules and design rules defined in the retail ticketing system 10. These rules might include, but is not limited to:

Theme Management of each ticket

Article Content Management of each ticket

The selection of Colours, Backgrounds, Fonts and various styling if certain criteria are met.

Defining what additional information are included or excluded on the tickets.

The printing of disclaimers if certain criteria are met.

Any additional content changes.

Global scripts (Future Development)

How fonts are handled server side.

These rules can be added in the template or the implementation logic. Additional scripting, internal or external programs written for a special run-time environment that automates the execution of tasks that could alternatively be executed one-by-one by a human operator, enables the designers to execute additional predefined business and design rules.

After the template has been approved for use, a non-editable template file will be rendered. This template will then be uploaded to the retail ticketing server 12, from where it can be assigned to various stores within the store hierarchy in the database system 13. A preview function makes it possible to get a visual representation of the proposed printed ticket.

Every template also has a unique version number, allowing users to easily retrieve prior versions of a given template. The retail ticketing system 10 also allows every store within the store hierarchy to use a different template revision, should they choose to do so.

The database system 13 of retail ticketing system 10 of the present invention, with specific mention of the JSON head-doc column, allows users to easily interact with a third party search engine. The retail ticketing system 10 is adapted to interact seamlessly with a third party search engine, such as Elasticsearch, to provide a distributed, multitenant-capable full-text search function with an HTTP web interface and schema-free JSON or XML documents. The integration of the third-party search engine allows the retail ticketing system 10 to provide scalable search, has near real-time search, and supports multitenancy that was not disclosed in the prior art.

The retail ticketing client 100 of an embodiment of the present invention is adapted to provide a ticketing interface 101 as a dashboard interface. The dashboard interface of the ticketing interface 101 is an easy understandable queuing facility from where batches of tickets can be printed. Batches can be added through a number of streams, including:
- changes identified by the Difference Engine.
- scheduled tasks that are executed overnight.
- tickets added from the Product Search facility.
- the importing comma-separated values (cvs) files containing all the information for the creation of a whole batch.
- assigning the above-mentioned batches to any, or all child stores.
- ad hoc adding of individual tickets.

The batches of printing jobs are managed through retail ticketing system's generic location approach. Because every article has a unique store location, the tickets can be smartly batched and printed in a store-friendly order. This distribution of the print jobs is handled by the message broker 129.

The message broker 129 will keep ticket to be done in an "Open" queue, and move to a "Completed" queue once the tickets are printed. Stores also have the option to have the batch confirmed before printing will commence. Batches that have already been printed, can also be easily identified and re-printed.

Although most tickets are added, managed and printed through the dashboard interface of the ticketing interface 101, the user has the option to manually add tickets to the printing queue. The main purpose of this function is to replace torn or missing tickets.

Based broadly on the ticketing dashboard interface, the retail ticketing client 100 further comprises a cast dashboard to provide a user a quick overview of any active, upcoming and expired boards for any store within the store hierarchy, depending on the user's permissions.

The following components make up the cast dashboard interface functionality:
- A Screen is any device (monitor/tv) that can display content. The customer usually owns this device.
- A Media Player is a device, associated with the retail ticketing system 10, that can render content to the Screen. It has been flashed with customised open source operating system and a custom player. Plug-and-play functionality allows the Media Player to be used on any Screen.
- A Board is a content group that is scheduled to be shown on a Screen. It is an HTML wrapper which can handle HTML templates, designed by a design team, and can display images, videos, multi-layer content. Rendering to HTML wrappers allows for the displaying of any content that can be published in HTML.

All the content that is allocated to every billboard or display has an assigned priority level. Users can define their own priorities and it can be as complex as they wish. The retail ticketing system 10 comprises a display scheduler that uses predefined priority rules to determine the order in which content will be displayed on the screens. In addition to the priority, a start and end date/time will determine if the contents are available for display.

Fall-back boards or default boards can be scheduled to be displayed if none of the other display criteria are met. This will prevent any screen from showing blank content. Fall-back boards can be a single image or video, but can also include multiple images and videos that would be displayed in the same manner as regular scheduled content.

Because of the complexity of the scheduler, a timeline view on the dashboard interface can give a user a visual representation of the processed priority rules in order to verify that the correct settings have been selected.

If a digital board is linked to a campaign (start/end date), sales data for the advertised articles in the campaign can be used to report on the effectiveness of the campaigns based on historical and current sales figures. It is therefore important to not only know when an article was scheduled for display, but also whether that advertisement was in fact shown. Feedback from the Screen, back to the retail ticketing system 10, allows for true figures on actual displayed content.

The Retail ticketing system 10 is adapted to track activities and allows a customer to get a detailed report on actions; for example:
- General Activity Report:
- Template Activity Report:
- Promotion Activity Report:
- Batch Activity Report:
- Cast Activity Report:

The option to export the report information, allows the customer to import the data into their own reporting tool. Other functions can be added or updated to the retail ticketing system 10 through custom plugins for bespoke requirements.

The retail ticketing system 10 of an embodiment of the present invention allows notifications to be distributed to individuals within a store on various levels of the organisation, using the store hierarchy. With this functionality, head office can send customised messages to individual users, all employees within a store or the whole organisation. The publisher can specify a date range on which these messages will be visible on the individual's dashboard. History of every message is kept and can be accessed through the administration interface.

Administrators also have the functionality available to notify users with a service message. This message advises all users of upcoming maintenance events, or any other important message, and appears on the login screen.

In one embodiment, the retail ticketing system 10 provides the functions for users to share within the store hierarchy organisational documents. These documents can be organised in customisable user-defined folders. Revisions are kept on every document and depending on the user's permission, the documents will be available on his/her dashboard. Custom properties on some entities to collect metadata and enrich business rules (ticketing defaults).

Whenever a new feature is developed and implemented on the retail ticketing system 10 of the present invention, it always has representational state transfer application programming interface integration included. This allows the retail ticketing system 10 to integrate with third parties at a later stage without any new development required. In another embodiment, the retail ticketing system 10 is adapted to render digital based content to social media APIs. Mobile friendly templates store in the retail ticketing system 10 may be used to generate a mobile-friendly presentation. In one embodiment, the presentation or print ticket is rendered by combining the data content retrieved from the database system 13 with an HTML5 format or Extensible Markup Language (XML) template.

It is understood that those persons skilled in the art that variations may be made in the core teachings of this invention.

Although the invention has been described with reference to specific examples, it will be appreciated by those skilled in the art that the invention may be embodied in many other forms, in keeping with the broad principles and the spirit of the invention described herein.

The present invention and the described embodiments specifically include the best method known to the applicant of performing the invention. The present invention and the described preferred embodiments specifically include at least one feature that is industrial applicable.

The invention claimed is:

1. A retail ticketing system comprising:
a database system including user or store profiles, retail ticket templates, customer information, and credential tokens of a user or store;
a user interface arranged for use on a terminal client device, the user interface including a retail ticketing interface, a digital signage interface, a mobile catalogue interface, an online advertisement interface, a contextual advertisement interface, and a business intelligence interface; and
a retail ticketing and digital signage server in network communication with the database system and one or more terminal client devices including the user interface;
the retail ticketing and digital signage server including:
a processing unit including a memory and queues;
a web services server controlled by the processing unit for receiving event messages, receiving credential tokens, generating a response to a terminal client device including sending a credential token to the terminal client device or denying access to the terminal client device, and delivering presentation data to the terminal client device, the presentation data including retail tickets, digital presentations, real-time personalized store catalogues, advertisements, consumer information, and business reports;
a credential server controlled by the processing unit for receiving a processed credential access requests from the web services server, verifying the credential access requests, retrieving a credential token from the database system, and passing the credential token to the web services server to generate the response to the terminal client device;
a profile management server controlled by the processing unit for storing and retrieving the user or store profiles, ticket templates, and customer information to and from the database system;
working modules controlled by the processing unit and including:
a ticketing module, associated with the retail ticketing interface, for printing the retail tickets;
a difference engine module, associated with the retail ticketing interface, for determining whether a retail ticket should be printed;
a digital signage module, associated with the digital signage interface, for generating the digital presentation for display on devices at a store location;
a mobile catalogue module, associated with the mobile catalogue interface, for generating the real-time personalized store catalogue for display to a customer mobile device;
an online advertising module, associated with the online advertisement interface and including a social media application programming interface, for generating the advertisement;
a context advertising module, associated with the context advertising interface, for collecting the customer information; and
a business intelligence module, associated with the business intelligence interface, to perform data analysis for generating the business reports;
a message broker controlled by the processing unit, wherein the message broker is adapted to receive event messages from the terminal client device, assign the event messages to a queue of the processing unit, schedule to distribute the event messages to one or more of the working modules for processing by a corresponding one of the working modules;
the business intelligence module adapted to:
learn a type of point of sale system associated with each store location;
decide, based upon the type of point of sale system at a corresponding one of each store location, whether to use, for collecting data from the point of sale system, a push application programming interface, a pull application programming interface, or a data agent; the data being schema-free; and
collect the data using the decided push or pull application program interface or the data agent;
wherein, the working modules further comprise an automated merchandising intelligence module adapted to perform real-time monitoring of the data collected from the point of sale system and a back office system adapted to determine what, where and when to advertise in the ticketing module and the digital signage module;
wherein the ticketing module and the digital signage module are adapted to directly draw the data collected from the point of sale system and the back office system via the message broker; and
wherein the difference engine module is adapted to accept a customisable script file within an implementation layer that allows integrators to perform customer-specific business logic whenever an entity within the database changes.

2. The retail ticketing system of claim 1, wherein the ticketing module is adapted to print quality colour or mono shelf tickets or labels based on automated marketing rules, combined with intelligent templates, pricing, and promotional data.

3. The retail ticketing system of claim 2, wherein the pricing and promotional data can be retrieved from one or more of: Point of Sale System (POS), Back Office System (BOS), Head Office System (HOS), Enterprise Resources Planning System (ERP), ecommerce sites, store or back office database, spreadsheet and text systems and combined with additional marketing information and images.

4. The retail ticketing system of claim 2, wherein the tickets or labels are printed by a managed print service that is adapted to optimise the cost per page independent to toner consumption.

5. The retail ticketing system of claim 2, wherein the tickets or labels are printed on a range of plain paper, perforated paper, pre-printed paper and displayed in POS display products such as clear semi-rigid pockets attached with clips.

6. The retail ticketing system of claim 1, wherein the digital signage module is adapted to generate unique, store-centric digital signage contents, with real-time store pricing and offers.

7. The retail ticketing system of claim 1, wherein the digital signage module is adapted to provide full creative control to a remote headquarter terminal for scheduling and executing digital content across store networks.

8. The retail ticketing system of claim 1, wherein the digital signage module is adapted to generate quality digital signage based on automated marketing rules combined with intelligent templates and pricing and promotional data.

9. The retail ticketing system of claim 1, wherein the digital signage module is adapted to remotely manage a plurality of display screen for displaying digital signage contents.

10. The retail ticketing system of claim 9, wherein the display screen comprises a commercial grade screen or a video wall with any mounting bracket.

11. The retail ticketing system of claim 1, wherein the mobile catalogue module is adapted to compile responsive personalised store catalogues for streaming pricing retrieved in real-time from the POS or BOS to mobile devices.

12. The retail ticketing system of claim 11, wherein the mobile catalogue module is adapted to compile a responsive personalised store catalogue based on location information of a mobile device.

13. The retail ticketing system of claim 1, wherein the online advertisement module is adapted to generate targeted online advertisement or content for social media news feeds The content is automatically generated based on merchandising rules and dynamic templates and published.

14. The retail ticketing system of claim 1, wherein the contextual advertisement module is adapted to combine customer images generated by facial recognition algorithm, location data generated by proximity beacons, and customer purchasing history received from loyalty programs to create customer profiles.

15. The retail ticketing system of claim 14, wherein the contextual advertisement module is adapted to analyse and track customer's journeys within a store in accordance with the customer profiles.

16. The retail ticketing system of claim 1, wherein the business intelligence module is adapted to generate correlation data based on an amount of sale of a product and a frequency of advertisement of the product across from a group of stores down to individual customers.

17. The retail ticketing system of claim 16, wherein the business intelligence module is adapted to create automated targeted merchandising content generation across all retail advertising channels.

18. The retail ticketing system of claim 1 further comprising a context store for managing information and display of a store by assigning a permission token to each user, wherein the permission token comprises different levels of access in a store-based hierarchy.

19. The retail ticketing system of claim 18, wherein the permission token is assigned to a user when the user logins to the system.

20. The retail ticketing system of claim 19, wherein the context store is adapted to determines a store which the user has permission to access and with reference to user selected input if the user has permission to access to more than one store.

21. The retail ticketing system of claim 1 wherein the customer specific logic comprises the step of receiving a copy of the entity that was changed, an old head-doc, and an new head-doc to determine which specific data attributes have changed, including previous values and current values, and if the change is deemed relevant to a business rule.

22. The retail ticketing system of claim 21, wherein, one of the business rules is, a retail ticket is not printed if it does not differ from a previously rendered ticket.

23. The retail ticketing system of claim 22 further comprising a printing management interface adapted to only send changed content to reduce network bandwidth.

* * * * *